(12) United States Patent
Becken et al.

(10) Patent No.: US 11,703,694 B2
(45) Date of Patent: Jul. 18, 2023

(54) OPTIMIZING A SPECTACLE LENS TAKING ACCOUNT OF A VISION MODEL

(71) Applicant: Rodenstock GmbH, Munich (DE)

(72) Inventors: Wolfgang Becken, Neuried (DE); Helmut Altheimer, Baisweil-Lauchdorf (DE); Adam Muschielok, Munich (DE); Yohann Bénard, Munich (DE); Anne Seidemann, Munich (DE); Andrea Welk, Munich (DE); Gregor Esser, Munich (DE)

(73) Assignee: Rodenstock GmbH, Munich (DE)

( * ) Notice: Subject to any disclaimer, the term of this patent is extended or adjusted under 35 U.S.C. 154(b) by 354 days.

(21) Appl. No.: 16/639,268

(22) PCT Filed: Aug. 9, 2018

(86) PCT No.: PCT/EP2018/071628
§ 371 (c)(1),
(2) Date: Jun. 24, 2020

(87) PCT Pub. No.: WO2019/034525
PCT Pub. Date: Feb. 21, 2019

(65) Prior Publication Data
US 2020/0326560 A1    Oct. 15, 2020

(30) Foreign Application Priority Data
Aug. 14, 2017  (DE) .......................... 102017007663.4

(51) Int. Cl.
*G02C 7/02* (2006.01)
*G02C 7/06* (2006.01)

(52) U.S. Cl.
CPC ............. *G02C 7/028* (2013.01); *G02C 7/027* (2013.01); *G02C 2202/22* (2013.01)

(58) Field of Classification Search
CPC ........ G02C 7/027; G02C 7/028; G02C 7/024; G02C 7/06; G02C 7/061; G02C 2202/22
See application file for complete search history.

(56) References Cited

U.S. PATENT DOCUMENTS

| 2004/0027679 A1 | 2/2004 | Welk et al. |
| 2011/0051082 A1* | 3/2011 | Becken ................ G02C 7/024 351/159.76 |

(Continued)

FOREIGN PATENT DOCUMENTS

| JP | 2005-500585 A | 1/2005 |
| JP | 2013-507649 A | 3/2013 |

(Continued)

OTHER PUBLICATIONS

German Patent Office, Office Action issued for DE 102017007663.4, 5 pgs., dated Apr. 27, 2018.

(Continued)

*Primary Examiner* — Dawayne Pinkney
(74) *Attorney, Agent, or Firm* — Banner & Witcoff Ltd.

(57) ABSTRACT

A computer-implemented method for calculating or assessing a spectacles lens for an eye of a spectacles wearer. The method includes (a) providing an association of at least one imaging property or aberration of a spectacle lens system with the vision of the spectacles wearer, or of an average spectacles wearer, when observing an object through the spectacles lens system; (b) determining or prescribing a target function for the spectacles lens to be calculated or assessed, in which the association from step (a) is to be evaluated; and (c) calculating or assessing the spectacles lens to be calculated or assessed by evaluating the target function, wherein the target function is evaluated at least once.

16 Claims, 5 Drawing Sheets

(56) References Cited

U.S. PATENT DOCUMENTS

| | | | |
|---|---|---|---|
| 2011/0202286 A1* | 8/2011 | De Rossi | G02C 7/028 |
| | | | 702/19 |
| 2012/0212705 A1* | 8/2012 | Calixte | G02C 7/027 |
| | | | 351/159.74 |
| 2012/0218513 A1 | 8/2012 | Yamakaji | |
| 2012/0229758 A1 | 9/2012 | Marin et al. | |
| 2013/0329186 A1* | 12/2013 | Contet | G02C 7/028 |
| | | | 351/159.77 |
| 2015/0002810 A1* | 1/2015 | Altheimer | G02C 7/027 |
| | | | 351/159.76 |
| 2015/0276987 A1* | 10/2015 | McKenzie | B33Y 80/00 |
| | | | 427/10 |
| 2016/0011437 A1 | 1/2016 | Nishimura et al. | |

FOREIGN PATENT DOCUMENTS

| | | |
|---|---|---|
| JP | 2013-511060 A | 3/2013 |
| JP | 2014-133166 B | 7/2014 |
| JP | 2015-506499 A | 3/2015 |
| WO | 2011058177 | 5/2011 |

OTHER PUBLICATIONS

European Patent Office, PCT International Search Report issued for PCT/EP2018/071628, 14 pgs., dated Nov. 22, 2018.
L. Thibos, "From Wavefronts to Refractions", Adaptive Optics for Vision Science, pp. 331-362 Copright 2006, John Wiley & Sons, Inc.
Jan. 20, 2023 (JP) Office Action—App. 2020-508392.

* cited by examiner

OPTIMIZING A SPECTACLE LENS TAKING ACCOUNT OF A VISION MODEL

BACKGROUND

The disclosure document WO 2013/104548 A1 describes an optimization of a spectacle lens which is based on those wavefronts that are determined in the direct calculation of light through the eye. Instead of being evaluated in the typical manner, the wavefronts are evaluated at the vertex sphere (SPK) on a plane in the eye and thus depend on the properties of the eye. With this method, the influence of the cornea, as well as of all other individual properties of the eye—for example the deviations of the anterior chamber depth or of other geometric parameters from the average population—may directly enter into the optimization of the spectacle lens via the wavefronts. The basis of this optimization method is a target function that depends on, in addition to the calculated wavefront properties (including their higher-order aberrations (HOAs)), target specifications and weightings that may be required for specific properties of the wavefronts in the eye.

What are to be understood by target specifications are hereby not only the reference wavefronts for full correction as are desired in the ideal instance, but rather also specifications for specific deviations, for example specifications for the order of magnitude of the unwanted astigmatism. In practical application, the optimization of the spectacle lens may be controlled via suitable selection of these target specifications and weights/weightings.

However, the disclosure document WO 2013/104548 A1 does not describe what type of target specifications and weightings lead to suitable spectacle lenses. However, it has turned out that, if the identical target specifications and weightings as are used at the vertex sphere are used for the optimization, entirely different designs result whose use is not to be ensured without additional extensive testing. Therefore, an entirely new design of reasonable target specifications and weightings would then be necessary for the optimization in the eye. As is apparent in the prior art for optimizations at the vertex sphere, novel, inventive steps are necessary in order to be able to establish reasonable target specifications and weightings in the first place.

With the means of the prior art, the average person skilled in the art would thus be faced with the choice of either performing the wave calculation in the eye and, starting from zero, acquiring new knowledge for discovering suitable target specifications and weightings, or using the prior art for target specifications and weightings, but then only therewith optimizing for the vertex sphere.

Moreover, although the proposed wavefront calculation makes progress with regard to the best possible evaluation plane, without a matching criterion for the assessment of the wavefront deviation, this possibly leads to no improvement in perception upon viewing through the spectacles.

SUMMARY

With this as background, it is an object of the present invention to overcome the above disadvantages of the prior art. It is an additional object to either use present vision models or establish new vision models, and to specify a rule as to how this is to be incorporated into the target function of an optimization in connection with the transformation of the target specifications and weightings.

A first aspect of the invention relates to a computer-implemented method for calculating (for example for optimizing) a spectacle lens for an eye of a spectacles wearer, including the steps:

a) providing an association of at least one imaging property or aberration of a spectacle lens system with the vision of the spectacles wearer, or of an average spectacles wearer, when observing an object through the spectacle lens system, b) determining or prescribing a target or quality function for the spectacle lens to be calculated, in which the association from step a) is to be evaluated or which depends on the associated vision value, c) calculating the spectacle lens to be calculated by evaluating the target function, wherein the target function is evaluated at least once, preferably multiple times. The calculation may in particular take place by means of an optimization method in which the target function is iteratively minimized or maximized Using the provided association from the above step a), it is also possible to perform an assessment of a spectacle lens without a calculation or an optimization of the spectacle lens necessarily needing to be performed. The assessment of the spectacle lens may take place for quality control, for example. The spectacle lens to be assessed may, for example, be described or provided using theoretical area values and/or using measured area values.

A second aspect of the invention thus relates to a computer-implemented method for assessing a spectacle lens for a spectacles wearer, including the steps:

a) providing an association of at least one imaging property or aberration of a spectacle lens system with the vision of the spectacles wearer, or of an average spectacles wearer, when observing an object through the spectacle lens system, b) determining or prescribing a target or quality function for the spectacle lens to be assessed, in which the association from step a) is to be evaluated or which depends on the associated vision value, c) assessing the spectacle lens by evaluating the target or quality function, wherein the target or quality function is evaluated at least once.

In the above step a), the association may be provided at a plurality of assessment locations or assessment points on an evaluation surface. In the above step c), the target or quality function may be evaluated at a plurality of assessment locations or assessment points on an evaluation surface. The evaluation of the target function may include a calculation of the at least one imaging property or aberration of the spectacle lens to be calculated or to be assessed in the plurality of assessment points.

In the method for optimizing a spectacle lens according to the prior art, a spectacle lens is optimized by minimizing or maximizing a target function, which involves actual (real) values and corresponding target values of at least one imaging property or aberration of the spectacle lens. The at least one imaging property or aberration may represent a direct quantification of a wavefront deviation from a reference wavefront. An example of a target function is, for example, the function:

$$F = \sum_i [G_{R,i}(R_{real}(i) - R_{target}(i))^2 + G_{A,i}(A_{real}(i) - A_{SPK,target}(i))^2 + \ldots],$$

wherein:
i (i=1 to N) designates an assessment location of the spectacle lens;

$R_{real}(i)$ designates the actual spherical effect or the refraction error at the i-th assessment location;

$R_{real}(i)$ [sic] designates the target spherical effect or the target refraction error at the i-th assessment location;

$Ast_{real}(i)$ designates the astigmatism or the astigmatic error at the i-th assessment location;

$Ast_{target}(i)$ designates the target astigmatism or the target astigmatic error at the i-th assessment location.

The variables $G_{Ri}$, $G_{Aj}$, ... are weights of the respective imaging property or aberration that are used in the optimization.

The imaging properties or aberrations of the spectacle lens may be evaluated at the vertex sphere or at an evaluation plane or evaluation surface in the eye, for example as described in WO 2015/104548 A1.

An assessment of a spectacle lens may likewise take place using the above target function, wherein the actual value of the at least one imaging property of the spectacle lens to be assessed is calculated at least at one assessment location of the spectacle lens to be assessed and is compared with the corresponding target value.

However, it has been recognized that, due to the depth of focus dependent thereon, a direct quantification of a wavefront deviation in diopters, without taking into account the effective pupil size, is not the best possible criterion in order to describe and assess the perception of a spectacles wearer through a spectacle lens.

According to the above aspect of the invention, in contrast to the conventional optimization or assessment methods, it is proposed to directly take the vision (visual acuity) into account in the target or quality function. The vision entering into the target or quality function depends, via an association, on at least one imaging property or aberration of a spectacle lens system, wherein the at least one imaging property or aberration may be evaluated at a suitable evaluation surface (for example at the vertex sphere or in the eye). The spectacle lens system may consist of at least one spectacle lens (for example a spectacle lens of refraction spectacles). The spectacle lens system preferably comprises additional components such as, for example, a model eye or eye model which may be based on average values of spectacles wearers or on at least one individual parameter of the eye of the spectacles wearer. Stated in a different way: the spectacle lens system, which is based on the association of at least one imaging property or aberration with the vision of the spectacles wearer, may be a spectacle lens-eye system.

The model eye is preferably likewise a component of the use position that is taken into account in the calculation of the spectacle lens to be calculated (for example to be optimized) or in the assessment of the spectacle lens to be assessed. The use position may likewise be characterized by additional average or individual parameters, such as corneal vertex distance (CVD), pantoscopic tilt, pupil distance etc.

An example of a target or quality function that depends on the vision V via the association of the at least one imaging property or aberration $\Delta U_{s,j}$ with the vision of the spectacles wearer or of an average spectacles wearer may have the following structure:

$$F_s = \sum_i \left[ G_{s,j,i}^V (V_{real}(\Delta U_{s,j}(i)) - V_{target}(\Delta U_{s,j}(i)))^2 + ... \right]$$

In the above formula, $V(\Delta U_{s,j}(i))$ designates a function which [sic] the dependency of the vision on at least one imaging property or aberration of a spectacle lens system at the i-th assessment point (i=1, 2, 3, ..., N) at an evaluation surface. Expressed in a different way: $V(\Delta U_{s,j}(i))$ describes an example of an association from step a). The argument $\Delta U_{s,j}$ is generic and may designate an arbitrary imaging property or aberration of a spectacle lens system which describes the effect of the spectacle lens system on a light beam emanating from an object, or the difference of the effects of the spectacle lens system on a light beam emanating from an object and on a reference light beam converging on the retina of the eye. One or more imaging propert(y/ies) or aberration(s) may thereby enter into the target or quality function and be evaluated, wherein the subscript j,j≥1 designates the j-th imaging property or aberration.

$V_{real}(\Delta U_{s,j}(i))$ designates the vision which is determined using the association and the actual value of the at least one imaging property of the spectacle lens to be calculated (for example to be optimized) or to be assessed at the i-th assessment point, and $V_{target}(\Delta U_{s,j}(i))$ designates the corresponding target value of the vision, The at least one imaging property or aberration may be calculated or evaluated at a suitable evaluation surface. The subscript "s" accordingly stands for an arbitrary evaluation surface of the at least one imaging property or aberration $\Delta U_{s,j}$. For example, the evaluation surface may be a plane (evaluation plane) or a curved (for example spherical) surface. The evaluation surface may, for example, be the vertex sphere or a surface in the eye, for example one of the following planes or surfaces:

a plane or a (for example spherical) surface behind the cornea, the leading surface of the lens of the eye, or a plane tangential to the leading surface of the lens of the eye, the trailing surface of the lens of the eye, or a plane tangential to the trailing surface of the lens of the eye, the plane of the exit pupil (AP), or the plane of the rear surface of the posterior optic surface (L2).

The variable $G_{s,iso,i}^N$ designates the weighting of the vision at the i-th assessment point, prescribed by the association with the imaging property $\Delta U_{s,j}$.

Either existing vision models may thereby be used, or one of the vision models described in the following, and in fact preferably in combination with a rule as to how the vision model, in connection with a transformation of the target specifications and weights, is to be incorporated into the target function of an optimization.

The at least one imaging property or aberration $\Delta U_{s,j}$ may, for example, be a second-order imaging property or aberration (such as astigmatism or the astigmatic error, spherical effect or refraction error, for example), a higher-order imaging property or aberration (HOA) (such as coma, trefoil aberration, spherical aberration, for example), or a combination of different imaging properties or aberrations. For example, higher-order imaging properties or aberrations (HOAs) may thus be mapped to the second-order imaging properties or aberrations via a prescribed metric (for example a linear metric).

The calculation of the at least one imaging property or aberration may take place by means of a wavefront calculation or a beam calculation or a wave field calculation, preferably at the use position of the spectacle lens. The wave field calculation entails a rigorous wave-optical calculation, in contrast to a wavefront calculation or a beam calculation, which both are classical terms from geometric optics.

The method may also include the following steps:

Calculation of at least one light beam emanating from the object for at least one viewing direction, with the aid of wavefront calculation (wavetracing) or beam calculation (raytracing) or wave field calculation through at least one surface of the spectacle lens system or of the spectacle lens to be calculated or to be assessed, up to an evaluation surface in the spectacle lens system. The calculation preferably takes place through at least one surface of the spectacle lens system, or of the spectacle lens to be calculated or to be assessed and the optical elements of a model eye (as a component of the spectacle lens system), up to an evaluation surface in the model eye.

The method may also include:

calculation of the difference, present at the evaluation surface, of the light beam emanating from the object in comparison to a reference light beam converging on the retina of the model eye, and determination of the at least one imaging property or aberration using the calculated difference.

For example, the at least one imaging property or aberration may directly quantify or represent the calculated difference. The at least one imaging property or aberration may also be a function of the calculated difference.

The reference light beam preferably has a spherical wavefront (reference wavefront).

The calculation of at least one light beam emanating from the object preferably takes place by means of wavefront calculation (wavetracing), wherein at the evaluation surface the difference (wavefront difference) between the wavefront of the light beam emanating from the object and the wavefront of the reference light beam converging on the retina is calculated. Preferably, it is not the direct wavefront deviation or wavefront difference in diopters that is used to calculate or optimize the spectacle lens, but rather the vision loss corresponding thereto in comparison with the maximum possible vision as a criterion for assessment of the wavefront deviation.

The wavefront difference may be described up to the second order by the difference of the vergence matrices of the wavefront of the light beam emanating from the object and the wavefront of the reference light beam converging on the retina. The difference of the two vergence matrices at the evaluation surface represents the difference vergence matrix. If higher-order imaging errors are taken into account, these may be mapped to the difference vergence matrix by means of a suitable metric (for example a linear metric).

According to a second aspect of the invention (which may be independent of the first aspect), the vision is not directly associated with the wavefront deviation or wavefront difference calculated at the evaluation surface; rather, at least one additional optical characteristic is initially calculated. The vision is associated with this optical characteristic.

The at least one additional optical characteristic may be an optical characteristic in the space of a geometric-optical angle. The method may consequently include an association of a (vectorial) geometric-optical angle and/or of a quadratic shape in the space of a geometric-optical angle with the calculated wavefront difference, wherein the at least one imaging property or aberration depends on at least one component of the geometric-optical angle and/or of the quadratic shape.

The association of a (vectorial) geometric-optical angle and/or of a quadratic shape in the space of a geometric-optical angle with the wavefront difference may, for example, take place using the dispersion disc on the retina of the model eye which corresponds to the respective wavefront.

In particular, for an arbitrary wavefront (such as an astigmatic wavefront that is not fully corrected, for example), there is a dispersion disc on the retina that may be approximated by an ellipse (dispersion ellipse). According to a simple overlap criterion, two objects are still perceived as separate if their dispersion discs or dispersion ellipses do not overlap. Other criteria are likewise possible. The parameters of the dispersion disc depend on the wavefront properties of the wavefront incident on the retina, and thus on the imaging properties of the spectacle lens or of the spectacle lens system.

Instead of the dispersion disc on the retina, a dispersion disc in the space of the geometric-optical angle at the object ($\gamma$-space), corresponding to the dispersion disc on the retina, is preferably used. A vectorial geometric-optical angle $\gamma=(\gamma_x, \gamma_y)$ may be specified for each fixed point $r_s=(r_{sx},r_{sy})$ on the edge of the effective pupil at an arbitrary evaluation surface or evaluation plane "s" in the eye. The scalar geometric-optical angle $\gamma$ is the object-side angle between two defined principal rays HS0 and HS (thus rays through the middle of the entrance pupil). The principal ray HS is established in that it strikes that edge point of the dispersion disc at which the point $r_s=(r_{sx},r_{sy})$ of the pupil edge is mapped. The other principal ray HS0 plays the role of a reference and strikes the middle of the dispersion disc. The definition of the vectorial geometric-optical angle is achieved in that it is taken into account that the $r_s=(r_{sx},r_{sy})$ has two components, and accordingly the angle $\gamma$ may be broken down into an x-component and a y-component. An example of a parameterization of the two principal rays as unit vectors in xyz-space is:

$$HS0=(0,0,1)^T \text{ and } HS=(\sin \gamma \cos \varphi, \sin \gamma \sin \varphi, \cos \gamma)^T,$$

wherein the light progresses in the positive z-direction. The vectorial geometric-optical angle is then given as $\gamma=(\gamma_x, \gamma_y)=(\sin \gamma, \cos \varphi, \sin \varphi)$. In paraxial approximation, $\sin \gamma = \gamma$ and therefore $\gamma=(\gamma_x, \gamma_y)=\gamma(\cos \varphi, \sin \varphi)$.

If a circular orbit around a point $r_s=r_s(\cos \varphi_s, \sin \varphi_s)^t$ on the edge of the respective pupil is imagined, ($r_s$=const.), then $\gamma$ in $\gamma$-space (meaning in the space of the vector $\gamma=(\gamma_x,\gamma_y)$) describes an ellipse. Two objects may then still be separately perceived (with regard to a simple overlap criterion) if their dispersion ellipses in $\gamma$-space do not overlap. Other criteria may likewise be prescribed.

A quadratic form (for example in the form of a matrix) may be used to describe the dispersion disc on the retina in $\gamma$-space. The at least one imaging property of the spectacle lens system or of the spectacle lens to be optimized may be determined using at least one of the components of the quadratic form or a combination of components of the quadratic form.

One advantage of considering imaging properties of a spectacle lens system or of a spectacle lens to be optimized in the space of the object-side geometric-optical angles is a better and simpler comparability with the vision of a spectacles wearer. An additional advantage is the automatic consideration of the pupil diameters. The geometric-optical angle also integrates the joint effect of an error correction and a given pupil diameter in precisely the manner that is crucial to the vision.

The association of the at least one imaging property or aberration of a spectacle lens system with the vision of the spectacles wearer, or the function $V(\Delta U_{s,y}(i))$, may parametrically depend on the measured initial vision and/or the measured sensitivity of the spectacles wearer.

The initial vision corresponds to the vision of the spectacles wearer upon viewing through a spectacle lens system with an effect that is determined by the refraction value of the respective eye of the spectacles wearer, i.e. given optimal correction of the error of the eye of the spectacles wearer. Expressed in a different way: what is understood by "initial vision" is that value of the vision that is achievable given the best possible correction (full correction), also referred to in technical language as "Visus cum correctione" or $V_{CC}$. The sensitivity of the spectacles wearer may be measured in that they can look through a lens with a predetermined error correction, and then their vision is determined. For example, the error correction may be from +0.5 dpt to +3.0 dpt; other values are also possible.

An example of an association of the at least one imaging property or aberration of a spectacle lens system with the vision of the spectacles wearer is based on the following basic function:

$$V(\Delta U) = (\gamma_0^k + (m\Delta U^p)^k)^{1/k},$$

wherein:
$\Delta U$ designates an imaging property or aberration of the spectacle lens system;
the parameter $\gamma_0$ depends on the value of the initial vision; and
the parameters k, m and p are parameters (not necessarily integer parameters) for describing the vision loss as a function of $\Delta U$.

In preferred units, $V(\Delta U)$ and $\Delta U$ are dimensionless, i.e. measured in radians. Under this assumption, typical parameter values are $0.5 \leq k \leq 4.0$, $0.5 \leq m \leq 4.0$, $1.0 \leq p \leq 2.0$.

As described above, the imaging property or aberration $\Delta U$ preferably corresponds to at least one of the components or a combination of components of a quadratic form in space of a geometric-optical angle, wherein the quadratic form is associated with the wavefront difference calculated at the evaluation surface.

The output value V of the above function preferably has the meaning of the geometric-optical angle (in radians) which corresponds to the current vision. The parameter $\gamma_0$ is preferably given directly by the value of the geometric-optical angle $\gamma_0$ (in radians) which corresponds to the current vision.

The association of the at least one imaging property of the spectacle lens system with the vision may take place using one or more provided value pairs, wherein each value pair are [sic] determined from i) a vision value of one of the eyes of the spectacles wearer (the eye for which the spectacle lens is calculated and optimized) upon looking through the spectacle lens system and ii) the spherical and/or astigmatic refractive power of the spectacle lens system.

The method may accordingly include a detection of at least one value pair consisting of i) the value of the vision of the eye of the spectacles wearer upon looking through a spectacle lens system (for example through a spectacle lens of a pair of refractive spectacles) having a defined spherical and/or astigmatic refractive power and ii) the spherical and/or astigmatic refractive power of the spectacle lens system. The refractive power of the spectacle lens system preferably relates both to the spherical and to the astigmatic refractive power. Higher-order properties or imaging errors (HOAs) may optionally be taken into account which, for example, may be mapped to the spherical and/or astigmatic refractive power by means of a metric.

The determination of the vision value given a defined spherical and/or astigmatic refractive power of the spectacle lens system is known from the prior art and, for example, may take place monocularly or binocularly using various tests, such as the Landolt test, for example. In one example, at least the vision of the eye of the spectacles wearer is detected given a spherical and/or astigmatic refractive power of the spectacle lens system that produces an optimal correction of the vision of the spectacles wearer.

Given one of the value pairs, the refractive power may be given by the refraction value of one of the eyes of the spectacles wearer. Given one of the value pairs, the refractive power may be given by the refraction value of one of the eyes of the spectacles wearer plus a spherical and/or astigmatic haze, i.e. plus an additional dioptric effect introduced by the refraction value of the eye. The additional dioptric effect may be a spherical effect, a cylindrical effect, or a combination of the two.

The dioptric distance from the refraction value of the eye, said dioptric distance corresponding to the haze, may have a value of between 0.5 dpt and 3.0 dpt. Other values are likewise possible.

A plurality of value pairs are preferably detected given different spherical and/or astigmatic haze, and an association of the vision with the at least one imaging property is determined therefrom.

As described above, the spectacle lens system and the use position of the spectacle lens to be calculated (for example optimized) or to be assessed, based on which the at least one imaging property or aberration is determined, may comprise a model eye or eye model, wherein the model eye is described with at least one of the following parameters: eye length, distances and curvatures of the refractive surfaces, refractive indices of the refractive media, pupil diameter, position of the pupil. The model eye may be, for example, an established model eye in which an ametropia (refraction deficit) is superimposed on a right-sighted basic eye. A description of a model eye, and of a spectacle lens system consisting of a spectacle lens and a model eye, is contained in, for example, the book by Dr. Roland Enders, "Die Optik des Auges und der Sehhilfen" ["Optics of the Eye and of Vision Aids"], Optische Fachveröffentlichung GmbH, Heidelberg, 1995, Pages 25 ff., and in the book by Diepes, Blendwoske, "Optik und Technik der Brille" ["Optics and Engineering of Spectacles"], Optische Fachveröffentlichung GmbH, Heidelberg, Page 47 ff. These publications are likewise referenced with regard to the technical terminology that is used; their corresponding statements inasmuch represent an integral component of the present application.

The parameters of the model eye may be average parameters. At least one of the parameters of the model eye may, however, be individually measured at the spectacles wearer and/or be determined from individual measurement values. The determination of an individual model eye or of an individual eye model using individual measurement values is described in DE 10 2017 000 772.1, for example, whose corresponding statements inasmuch represent an integral component of the present application.

The calculation or optimization of the spectacle lens to be optimized takes place via minimization or maximization of the target function described above, which directly involves the vision. The target function is evaluated at least once, preferably multiple times. At least one of the surfaces of the spectacle lens is preferably varied, and at each variation step the at least one imaging property or aberration of the spectacle lens arranged in a predetermined use position is calculated. Using the calculated imaging property or aberration and the predetermined association, the corresponding vision value (real vision value) may be determined and compared with the predetermined target vision value. The above steps are iteratively repeated until a predetermined optimization criterion is reached.

Further aspects of the invention relate to a device for calculating (for example for optimizing) a device for assessing a spectacle lens for an eye of a spectacles wearer, and a device for manufacturing a spectacle lens, comprising respective computing means (such as calculation or optimization means, for example) which are designed to calculate (for example to optimize) or to assess the spectacle lens according to a method for calculating (for example optimizing) or assessing a spectacle lens according to any of the aspects and/or examples described above. The device for manufacturing a spectacle lens also comprises processing means which are designed to process the spectacle lens according to the result of the calculation or optimization. The processing means may comprise, for example, CNC-controlled [sic] machines for direct processing of a blank according to the determined optimization specifications. Alternatively, the spectacle lens may be manufactured by means of a casting method. The finished spectacle lens has a simple spherical or rotationally symmetrical aspherical surface and a surface calculated or optimized according to the method according to the invention and according to individual parameters of the spectacles wearer. The simple spherical or rotationally symmetrical aspherical surface is preferably the leading surface (meaning the object-side surface) of the spectacle lens. However, it is of course possible to arrange the optimized surface as a leading surface of the spectacle lens. Both surfaces of the spectacle lens may also be optimized. The spectacle lens may be a single vision spectacle lens or a progressive spectacle lens.

The device for calculating (for example for optimizing) a spectacle lens, for assessing a spectacle lens, or for manufacturing a spectacle lens may comprise at least one of the following components:

a vision association module to provide an association of at least one imaging property or aberration of a spectacle lens system with the vision of the spectacles wearer or of an average spectacles wearer upon observing an object through the spectacle lens system;

a target function specification and/or determination module to determine or prescribe a target function for the spectacle lens to be optimized, in which the association from step (a) of the method is to be evaluated; and a calculation module to calculate or optimize the spectacle lens to be optimized by minimizing or maximizing the target function, wherein the target function is evaluated at least once;

an assessment module to assess the spectacle lens to be assessed by evaluating a target function, wherein the target function is evaluated at least once.

The device for calculating (for example for optimizing) a spectacle lens, for assessing a spectacle lens, or for manufacturing a spectacle lens may also comprise at least one of the following components:

a vision detection module to detect at least one value pair consisting of a vision value of one of the eyes of the spectacles wearer upon looking through the spectacle lens system, and to detect an effect of the spectacles lens system;

a vision model determination module to determine the association of at least one imaging property or aberration of a spectacle lens system with the vision using the at least one value pair;

an eye parameter detection module to detect the refraction deficit or refraction value, and optionally to detect at least one additional parameter of at least one eye of the spectacles wearer;

an eye model determination module to determine a model eye using at least one parameter of the eye of the spectacles wearer;

a use position parameter detection module to determine at least one individual parameter of the use position of the spectacle lens to be optimized;

a surface model database to predetermine a first surface and a second surface for the spectacle lens to be calculated or optimized (start surfaces);

a module to calculate at least one light beam emanating from the object for at least one viewing direction with the aid of wavetracing or raytracing or wave field calculation through at least one surface of the spectacle lens system or of the spectacle lens to be optimized or to be assessed, and if applicable through the optical elements of the model eye, up to an evaluation surface in the spectacle lens system, for example an evaluation surface in the eye;

an evaluation module to evaluate the difference, present at the evaluation surface, of the light beam emanating from the object in comparison to a reference light beam converging on the retina of the eye; and/or an evaluation module to evaluate or determine at least one imaging property or aberration using the calculated difference.

The computing means (for example calculation or optimization means) and the corresponding calculation or determination or evaluation modules may comprise suitably configured or programmed computers, specialized hardware, and/or computer networks or computer systems etc. which have a signal connection with at least one storage by means of suitable interfaces, and in particular read out and/or modify the data stored in the storage. For example, the detection means may be realized by means of graphical user interfaces, electronic interfaces etc. The calculation or optimization means may also comprise at least one preferably interactive graphical user interface (GUI) which enables a user to input and/or modify data.

The invention also offers a computer program product, in particular in the form of a storage medium or a data stream which contains program code, which is designed to implement a method for calculating (for example for optimizing) or assessing a spectacle lens according to any of the aspects and/or examples described above when loaded and executed at a computer.

Moreover, the invention offers a method for manufacturing a spectacle lens, including:

calculating or optimizing a spectacle lens according to the method for calculating (for example optimizing) a spectacle lens according to any of the aspects and/or examples described above; and production of the spectacle lens calculated (for example optimized) in such a manner.

Furthermore, the invention offers a use [sic] a spectacle lens manufactured according to the manufacturing method according to the invention in a predetermined average or ideal use position of the spectacle lens in front of the eyes of a defined spectacles wearer, for correction of an ametropia of the spectacles wearer.

With the proposed methods and devices according to any of the above aspects and examples, the assessment of the imaging properties or aberrations of a spectacle lens may be improved and be adapted to the actual perception of a spectacles wearer upon viewing through the spectacle lens. The advantages of a calculation in the eye may also be linked with the experience of finding target specifications and weights for which a prior art exists only at the vertex sphere. Conventional target specifications and weights at the vertex sphere are thereby repeated not only from the beginning inside the eye. Instead of this, the preexisting target specifications and weights at the vertex sphere are preferably transformed via a suitable rule at every desired evaluation surface or evaluation plane inside the eye. Moreover, a constructive rule is preferably specified according to which an existing design for a spectacle lens (thus the result of an optimization of a spectacle lens) at the vertex sphere may be reproduced at a desired evaluation plane or evaluation surface inside the eye via suitable transformation of the target specifications and weights given an optimization. This may take place via a normalization method by means of which, for example, the methods described in the disclosure document WO 2013/104548 A1 do not inherently lead to new designs, but rather do so only in combination with deviations of the parameters (model parameters and imaging errors of the eye) from standard values that are to be pre-established. Variations of the parameters may thus be directly translated into variations of the design.

BRIEF DESCRIPTION OF THE FIGURES

Preferred embodiments of the invention are explained by way of example in the following, at least in part with reference to the drawings. Thereby shown are.

DETAILED DESCRIPTION

Figure 1:
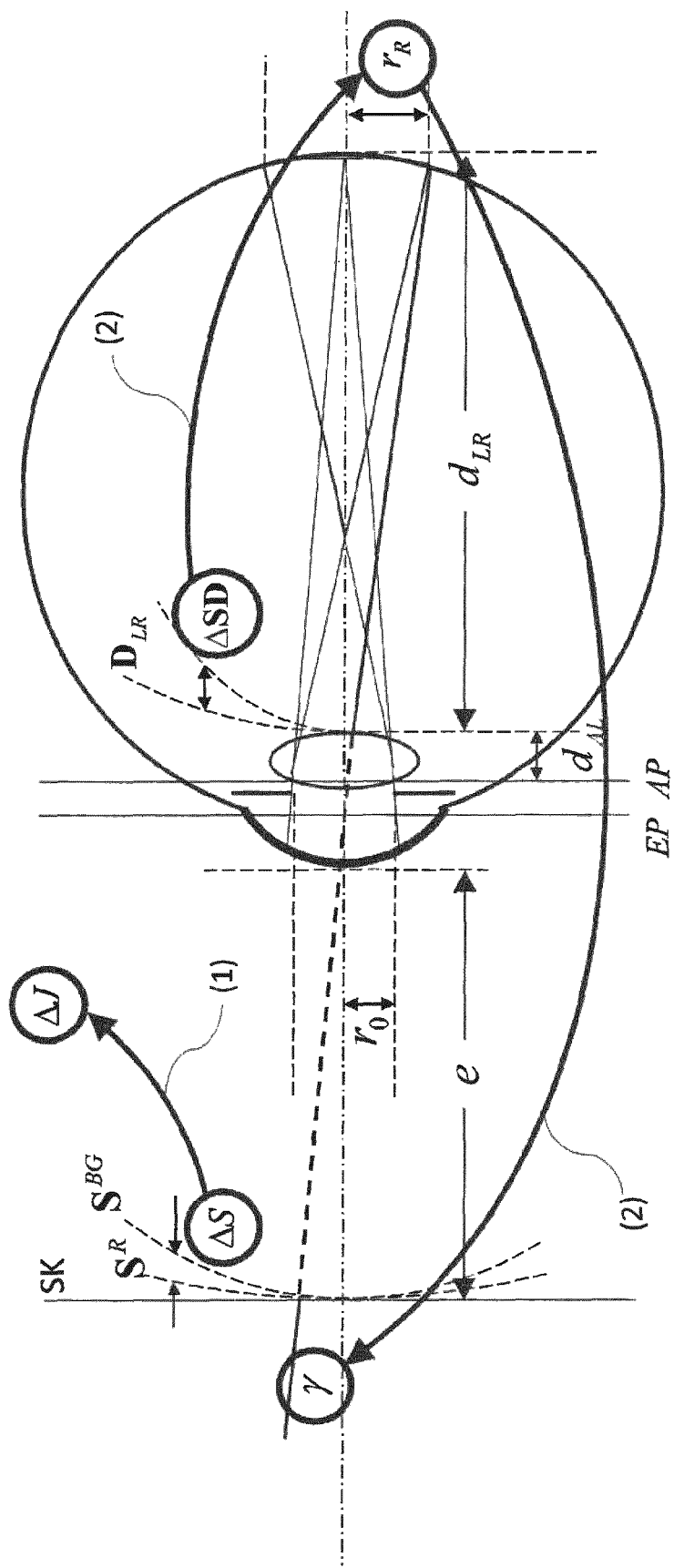
FIG. 1 a schematic spectacles-eye system.

In general, in this specification bold-faced lowercase letters should designate vectors, and bold-faced uppercase letters should designate matrices (such as the (2×2) vergence matrix S, for example). Italicized lowercase letters (such as d, for example) designate scalar variables.

Furthermore, bold italicized uppercase letters should designate wavefronts or surfaces as a whole. For example, $S$ designates the vergence matrix of the similarly named wavefront $S$; $S$ alone also encompasses the entirety of all higher-order aberrations (HOAs) of the wavefront, except for the 2nd-order aberrations that are included in S. Considered mathematically, $S$ stands for the set of all parameters that are necessary in order to describe a wavefront (sufficiently precisely) in relation to a given coordinate system. $S$ preferably stands for a set of Zernike coefficients having a pupil radius, or a set of coefficients of a Taylor series. $S$ particularly preferably stands for the set from a vergence matrix S to describe the 2nd-order wavefront properties and a set of Zernike coefficients (with a pupil radius) that serves to describe all remaining wavefront properties except those of the second order, or a set of coefficients according to a Taylor decomposition. Analogous statements apply to surfaces instead of wavefronts.

Preferably, it is not the direct wavefront deviation in diopters, but rather the vision loss corresponding thereto relative to the maximum possible vision, that is utilized/used as a criterion for assessing the wavefront deviation. Either existing vision models or one of the vision models described in the following may thereby be used, and in fact preferably in combination with a rule as to how the vision model is to be incorporated into the target function of an optimization in conjunction with the transformation of the target specifications and weights.

A first example of a method for calculating or optimizing a spectacle lens may include the following steps:

Step S1: Calculate at least one light beam emanating from an object, with the aid of wavetracing or raytracing, through the optical elements of the eye up to an evaluation plane or evaluation surface in the eye, for example to behind the cornea, up to the leading surface of the eye lens, up to the rear surface of the eye lens, up to the exit pupil AP, or to the rear surface L2 of the lens.

Step S2: Calculate, at the evaluation plane or evaluation surface, the differences of the light beam relative to a reference light beam converging on the retina;

Step S3: Assess the differences of the light beam in comparison to a reference light beam, for example due to the size of the dispersion disc on the retina;

Step S4: Associate a vision value with the assessed difference of the light beam from step S3;

Step S5: Construct a target function that depends on the associated vision value.

The individual steps may respectively be implemented in a more specialized form:

Step S1: Calculate wavefronts through the optical elements of the eye, up to the exit pupil AP or to the rear surface L2 of the lens;

Step S2: Calculate the differences via comparison of these wavefronts with spherical reference wavefronts, and calculation of the differential wavefront;

Step S3: Assess the differences of the first light beam in comparison to a reference light beam, via association of geometric-optical angles (or of a quadratic form to describe the ellipse in the object-side space of the geometric-optical angle) relative to the differential wavefront at AP/L2;

Step S4: Associate a vision value with the quadratic form, wherein the association rule parametrically depends on the measured output vision (and the measured sensitivity) of the patient;

Step S5: Construct a target function that depends on the associated vision value.

A further example of a method that in particular relates to the vision model uses the above step 4 as a starting point. The method may include the following steps:

Step S1': Provide an association of the effect of an optical system on a light beam emanating from an object with the vision of a person upon viewing the object through the optical system;

Step S2': Construct a target function for a spectacle lens to be optimized, in which the association from step (a) [sic] is to be evaluated;

Step S3': Calculate the spectacle lens by minimizing the target function, wherein the target function is evaluated at least once.

In preferred embodiments, the steps may be refined:

For step S1':

The provided association of the effect of the optical system with the vision may be determined using one or more provided value pairs from vision value of the eye of the person upon viewing through an optical system (for example of a spectacle lens of refraction spectacles)

spherical and/or astigmatic refractive power of the optical system.

Also:

given one of the value pairs, the refractive power may be provided by the refraction value of the eye, and/or given one of the value pairs, the refractive power may be provided by the refraction value of the eye plus a spherical and/or astigmatic haze, wherein a dioptric distance corresponding to the haze preferably has a value of between 0.5 dpt and 3.0 dpt.

The association of the effect of the optical system with the vision may be implemented using an eye model. The eye model may be described with at least one of the following parameters: eye length, distances and curvatures of the refractive surfaces, refractive indices of the refractive media, pupil diameter, position of the pupil, wherein at least one of the parameters of the eye model has preferably been individually measured at the person and/or has been determined from individual measurement values, for example as described in DE 10 2017 000 772.1.

For step S3':

To evaluate the target function, a light beam emanating from an object point may be determined for at least one viewing direction with the aid of wavetracing or raytracing through the optical elements of the eye, up to an evaluation plane in the eye, for example to behind the cornea, up to the leading surface of the eye lens, up to the rear surface of the eye lens, up to the exit pupil AP, or to the rear lens surface L2.

To evaluate the target function, the differences of the light beam that are present at the evaluation plane or evaluation surface in comparison with a reference light beam converging on the retina may be calculated, wherein the calculated differences are assessed in the evaluation of the target function, for example via the size of the dispersion disc on the retina.

FIG. 1 shows a schematic depiction of a spectacle lens system comprising a model eye, and illustrates the determination of the geometric-optical angle, wherein the calculation of the residual astigmatism according to the prior art (see for example EP 2 499 534) is shown with "(1)", and the calculation of the differential wavefront and of the geometric-optical angle is shown with "(2)".

In particular, in this regard it is assumed that a light beam emanates from an object point with a spherical wavefront and propagates up to the first spectacle lens surface. There, the light beam is refracted and subsequently propagates up to the second spectacle lens surface, where it is refracted again. The light beam exiting from the spectacle lens subsequently propagates in the direction of the eye until it strikes the cornea, where it is again refracted. After a further propagation within the anterior chamber of the eye up to the eye lens, the light beam is also refracted by the eye lens and propagates up to the retina.

The effect of the optical system, consisting of the spectacle lens and the model eye, on the light beam emanating from the object may be determined by means of raytracing or by means of wavetracing. A wavetracing preferably takes place, wherein preferably only one ray (the principal ray, which preferably travels through the center of rotation of the eye) and the derivatives of the rise heights of the wavefront are calculated, per observation point of the spectacle lens, according to the transversal coordinates (orthogonal to the principal ray). These derivatives are taken into account up to the desired order, wherein the second derivatives describe the local curvature properties of the wavefront and coincide with the second-order imaging properties or aberrations. The higher derivatives of the wavefront coincide with the higher-order imaging properties or aberrations.

In the calculation of light through the spectacle lens to the inside of the eye, the local derivatives of the wavefronts are determined at a suitable position in the beam path in order to compare them there with a reference wavefront which converges at a point on the retina of the eye. In particular, the two wavefronts (meaning the wavefront coming from the spectacle lens and the reference wavefront) are compared with one another at an evaluation plane (for example at an evaluation surface). A spherical wavefront whose center point of curvature lies on the retina of the eye may serve as a reference wavefront.

At the vertex sphere SPK (also designated as SK), the vergence matrices $S^R$ and $S^{BG}$ of the formula ($S^R$) and the wavefront from the spectacle lens ($S^{BG}$) have the following form:

$$S^R = \begin{pmatrix} M^R + J_0^R & J_{45}^R \\ J_{45}^R & M^R - J_0^R \end{pmatrix}; \tag{1}$$

$$S^{BG} = \begin{pmatrix} M^{BG} + J_0^{BG} & J_{45}^{BG} \\ J_{45}^{BG} & M^R - J_0^{BG} \end{pmatrix}$$

with the astigmatic components of their power vectors $$J^R = \begin{pmatrix} J_0^R \\ J_{45}^R \end{pmatrix}; J^{BG} = \begin{pmatrix} J_0^{BG} \\ J_{45}^{BG} \end{pmatrix} \tag{2}$$

The above vergence matrices, or the power vectors that contain second-order imaging properties or aberrations, may thereby occur as follows: either via a direct second-order wavetracing or via a wavetracing including higher-order aberrations (HOAs) that are then taken into account in the second-order errors or aberrations by means of a metric.

Calculation of the Wavefronts

Second-Order Wavetracing:

For the sake of simplicity, the plane L2 (rear lens surface) is assumed as an evaluation plane in the following. However, instead of L2, an arbitrarily different evaluation plane or evaluation surface "s" in the eye may be used.

If a wavefront enters into the eye, it is repeatedly propagated and refracted, which is described by the transfer matrix $$T = \begin{pmatrix} A & B \\ C & D \end{pmatrix}. \tag{4}$$

In order to calculate the wavefront in the eye, the vergence matrix $S^{BG}$ must be subjected [sic] corresponding to the application of T, such that:

$$S^{BG} \xrightarrow{T} S^{BG} \tag{5}$$

However, it is not a variable derived from the vergence matrix of the prescription $S^R$ that serves as a reference vergence, but rather a spherical reference vergence with the reference vergence matrix $D_{LR}$.

Instead of comparing $S^{BG}$ with $S^R$ as in the prior art, i.e. with the reference wavefront at the vertex sphere SPK or SK, the spectacle lens may be optimized on the basis of the spherical reference vergence matrix $D_{LR}$ and the transformed vergence matrix $S^{BG}$, in that the transformed vergence matrix $S^{BG}$ is compared with the reference vergence matrix $D_{LR}$.

The second-order calculation from equation (5) corresponds in terms of content to the calculation in WO 2013/104548 A1, which in equation (2) there leads to the vergence matrix S'.

Wavetracing Including the Higher-Order (Meaning of an Order Greater than 2) Imaging Errors or HOAs:

A wavetracing including HOAs is described in WO 2013/104548 A1. Instead of being described by S', the result of the calculation may then be described by a corresponding wavefront representation that also takes into account higher-order imaging errors. Zernike coefficients are preferably used for this, and particularly preferably the Taylor representation, so that the local derivations of the wavefront $W_{xx}$, $W_{xy}$, $W_{yy}$, $W'_{xxx}$, $W'_{xxy}$, $W'_{xyy}$, $W'_{yyy}$, $W'_{xxxx}$ etc. may be directly used in the latter. The evaluation surface in the eye is generally designated by "s", wherein the evaluation surface is preferably the exit pupil or the rear lens surface (meaning that "s"="AP" or "s"="L2"). An effective second-order wavefront may be associated with this wavefront by means of a metric. The metric may be a linear metric, for example.

Calculation of the Differential Wavefront
Second-Order Calculation

In this instance, for the further procedure the starting point is the difference or differential wavefront which may be described in the second order by the differential vergence matrix $\Delta SD_s$:

$$\Delta SD_s = S'^{BG}_s - D_{LR}. \quad (6a)$$

Calculation Including HOA:

In the general instance, the difference of the wavefronts $S'_s$ and the reference wavefront $R'_s$ is calculated. This difference is preferably mapped by means of a metric in the space of the vergence matrices:

$$\Delta SD_s = \text{Metric}(S'^{BG}_s - R'_s) \quad (6b)$$

In the event that the metric is preferably linear, the result from equation (6b) is the same as that from equation (6a), if it is set there that:

$$S'^{BG} = \text{Metric}(S'_s)$$

$$D_{LR} = \text{Metric}(R'_s) \quad (6c)$$

One possible metric relates to the representation of $S'^{BG}_s - R'_s$ in the form of Zernike coefficients. For example, what is known as the RMS metric may be used, which uses the pupil radius $r_0$ and otherwise uses only the second-order Zernike coefficients, i.e. $c_2^0, c_2^2, c_2^{-2}$. The power vector components are then:

$$M = -\frac{4\sqrt{3}}{r_0^2}c_2^0, \quad J_0 = -\frac{2\sqrt{6}}{r_0^2}c_2^2 \quad (6d)$$

$$J_{45} = -\frac{2\sqrt{6}}{r_0^2}c_2^{-2}$$

and the differential matrix is then provided by:

$$\Delta SD_s = \begin{pmatrix} M+J_0 & J_{45} \\ J_{45} & M-J_0 \end{pmatrix} \quad (6e)$$

Further examples of metrics are to be found in EP 2 115 527 B1, and in J. Porter, H. Quener, J. Lin, K. Thorn and A. Awwal, *Adaptive Optics for Vision Science* (Wiley 2006).

Assessment of the difference between the light beam and the reference light beam After a propagation through the spectacle lens and the eye, the wavefront is generally no longer spherical. For such an astigmatic wavefront that is not fully corrected, there is on the retina a dispersion disc that may be approximated with an ellipse (dispersion ellipse).

The assessment of the differences of the light beam in comparison to the reference light beam may take place via the parameters (such as the size, for example) of the dispersion disc on the retina. In a preferred embodiment, the assessment of the differences takes place via the parameters of a dispersion disc in the object-side space of a geometric-optical angle which corresponds to the dispersion disc on the retina. The assessment of the differences of the light beam in comparison with the reference light beam may in particular include an association of i) geometric-optical angles or ii) of a quadratic form for describing the dispersion disc in object-side space of geometric-optical angles relative to the differential wavefront at the evaluation surface.

Association of Geometric-Optical Angles

In a preferred example, the variable $\Delta SD$ is not used directly for optimization; rather, first a variable that has yet to be further calculated is computed from $\Delta SD$, namely the geometric-optical angle $\gamma$ (see FIG. 1).

As described above, for an astigmatic, not fully corrected wavefront, there is a dispersion disc on the retina that may be approximated with an ellipse (dispersion ellipse). The dispersion ellipse on the retina corresponds to an ellipse in the space of the object-side geometric-optical angle. A geometric-optical angle $\gamma = (\gamma_x, \gamma_y)$ can be specified for each fixed point $r_s = (r_{sx}, r_{sy})$ at the edge of the exit pupil (in the event that a: s="A"), at the edge of the effective pupil on the rear lens surface (in the event that b: s="L"), or at the edge of the effective pupil at an arbitrary evaluation plane "s" in the eye. If a circular orbit ($r_s$=const.) is imagined around a point $r_s = r_s(\cos\varphi_s, \sin\varphi_s)^t$ at the edge of the respective pupil, then $\gamma$ describes an ellipse in $\gamma$-space. Two objects may then still be separately perceived (with regard to a preliminary and simple overlap criterion) if their dispersion ellipses do not overlap in $\gamma$-space.

The differential wavefront $\Delta SD_s$ at the evaluation surface "s" corresponds to a dispersion ellipse which may be described on the basis of the following correlation:

$$\gamma = \Delta Q_s r_s \quad (7a)$$

with $$\Delta Q_s = \mu_s(A_s^t - \sigma_s C_s^t)\Delta SD_s \quad (7b)$$

wherein $$\mu_s = \begin{cases} 1 \\ d_{LR}/d_{AR} \\ \dots \end{cases} \quad (7c)$$

$$\sigma_s = \begin{cases} 0 \\ \tau_{AL} \\ \dots \end{cases}$$

$$\Delta SD_s = \begin{cases} \Delta SD_A \\ \Delta SD_L \\ \dots \end{cases}$$

$$r_s = \begin{cases} r_{AP}, \text{ in the event of } a) \\ r_L, \text{ in the event of } b), \\ \dots \end{cases}$$

with $$\Delta SD_A = S'^{BG}_A - D_{AR}$$

$$\Delta SD_L = S'^{BG}_L - D_{LR} \quad (7d)$$

In the above formulas:

$\sigma_s$ designates a (reduced, i.e. relative to the optical index of refraction) length that characterizes the evaluation surface or evaluation plane from the exit pupil AP;
$r_s$ designates the radius of the effective pupil at the evaluation plane or evaluation surface in the eye;
$r_{AP}$ designates the radius of the exit pupil of the eye;
$\tau_{AL}$ designates the radius of the effective pupil at the rear lens surface.

The actual dispersion ellipse may then be generated via the postulation $|r_s|^2 = r_s^t r_s = r_s^2 = \text{const.}$, since then the quadratic form $$\gamma^t \Delta Q_s^{-1t} \Delta Q_s^{-1} \gamma = r_s^2$$

$$\gamma^t \Delta W_s \gamma = 1 \tag{8}$$

with the symmetrical matrix $$\Delta W_s = \Delta V_s^{-1t} \Delta V_s^{-1}, \tag{9}$$

wherein $$\Delta V_s = r_s \Delta Q_s, \tag{9a}$$

describes an ellipse in $\gamma$-space (i.e. in the space of the geometric-optical angle) whose semi-axes are provided by the roots from the inverse eigenvalues of the matrix $\Delta W_s$.

The matrix $\Delta V_s$ is generally not symmetrical, and therefore has one more degree of freedom than the symmetrical matrix $\Delta SD$ (the unit of $\Delta V_s$ that of an angle (radians), and not the diopter of a wavefront metric). However, since the fourth, additional degree of freedom does not relate to the sharpness of an image, but rather only rotates the axial position of the blurriness, the fourth degree of freedom may be transformed away via a symmetrization rule.

For this, a rotation matrix $R_s$ is determined $$R_s = \begin{pmatrix} \cos\phi_s & -\sin\phi_s \\ \sin\phi_s & \cos\phi_s \end{pmatrix} \tag{10}$$

so that the matrix $\Delta U_s$ $$\Delta U_s = \begin{pmatrix} \Delta U_{s,xx} & \Delta U_{s,xy} \\ \Delta U_{s,xy} & \Delta U_{s,yy} \end{pmatrix} \tag{11}$$

$$:= \Delta V_s R_s$$

$$= \mu_s r_s (A_s^t - \sigma_s C_s^t) \Delta SD_s R_s$$

is symmetrical, meaning that $$\varphi_s = \arctan \frac{\Delta Q_{xy} - \Delta Q_{yx}}{\Delta Q_{xx} + \Delta Q_{yy}} \tag{12}$$

must be set to zero.

Because the symmetrical matrix $\Delta U_s$ is sufficient to assess the visual acuity, this, or at least a variable derived therefrom, is preferably used in the target function used to calculate or optimize the lenses, and in fact as described below is not used directly but rather via the association of a vision value.

The variables derived from the matrix $\Delta U_s$ may be an anisotropic and an isotropic component of the matrix $\Delta U_s$. Suitable for this is a decomposition of $\Delta U_s$ into an isotropic and an anisotropic portion, or into an isotropic and an anisotropic component, which are defined via the eigenvalues of $\Delta U_s$:

$$\Delta u_{s1} = \frac{\Delta U_{s,xx} + \Delta U_{s,yy} + \sqrt{(\Delta U_{s,xx} - \Delta U_{s,yy})^2 + 4\Delta U_{s,xy}^2}}{2} \tag{13}$$

$$\Delta u_{s2} = \frac{\Delta U_{s,xx} + \Delta U_{s,yy} - \sqrt{(\Delta U_{s,xx} - \Delta U_{s,yy})^2 + 4\Delta U_{s,xy}^2}}{2}$$

The isotropic portion or the isotropic components $\Delta U_{s,iso}$ of $\Delta U_s$ is defined as follows:

$$\Delta U_{s,iso} := \frac{\Delta u_{s1} + \Delta u_{s2}}{2} = \frac{\Delta U_{s,xx} + \Delta U_{s,yy}}{2} \tag{14}$$

The anisotropic portion or the anisotropic components $\Delta U_{s,aniso}$ of $\Delta U_s$ is defined as follows:

$$\Delta U_{s,aniso} := |\Delta u_{s1} - \Delta u_{s2}| = \sqrt{(\Delta U_{s,xx} - \Delta U_{s,yy})^2 + 4\Delta U_{s,xy}^2} \tag{15}$$

Step S4: Association of a vision value with the assessed difference of the light beams The association of a vision value with the assessed difference of the light beams may include an association of a vision value with the quadratic form $\Delta U_s$ describing the dispersion ellipse, or with the variables derived from the quadratic form.

In one example, the variables $\Delta U_{s,iso}$, $\Delta U_{s,aniso}$ are not directly utilized for optimization of the spectacle lens. Instead of this, the variables $\Delta U_{s,iso}$, $\Delta U_{s,aniso}$ serve as a starting point in order to determine the vision belonging to $\Delta U_{s,iso}$, $\Delta U_{s,aniso}$ in a manner defined by a given vision model. For this purpose, patient data or spectacles wearer data may be required, in particular the vision given full correction $VA_{cc}$.

What is understood by a vision model is in particular any function $V(\Delta U_s)$ that has the following features:

The argument $\Delta U_s$ is the matrix defined in equation (11), or at least a variable derived from the matrix $\Delta U_s$, for example at least one of its components or a combination of components. That combination formed by the components $\Delta U_{s,iso}$, $\Delta U_{s,aniso}$ is preferable.

$V(\Delta U_s)$ has a scalar value, and the calculated value stands for the vision. It is preferably be specified in radians (thus in the meaning of the geometric-optical angle) or in arc minutes or decimal units (for example V=0.8; 1.0; 1.25; 1.6; 2.0), or in units of log MAR (for example V=−0.3; −0.2; −0.1; 0.0; 0.1; . . . ). The following association thereby preferably applies:

TABLE 1

| V [arc minutes] | V [radians] | V [decimal] | V [logMAR] |
|---|---|---|---|
| 0.5' | 0.000145 | 2.0 | −0.3 |
| 0.63' | 0.00018 | 1.6 | −0.2 |
| 0.8' | 0.00023 | 1.25 | −0.1 |
| 1.0' | 0.00029 | 1.0 | 0.0 |
| 1.25' | 0.00036 | 0.8 | +0.1 |

Suitable vision models are known from the prior art. However, a new vision model is preferably proposed that is based on the following basic function:

$$V(\Delta U) = (\gamma_0^k + (m\Delta U^p)^k)^{1/k} \tag{16}$$

It thereby applies that:

The argument $\Delta U$ is generic and may be one of the variables $\Delta U_{s,iso}$, $\Delta U_{s,aniso}$, a combination of these variables, another variable derived from the matrix $\Delta U_s$, or a combination thereof;

The parameter $\gamma_0$ is directly provided by the value of the geometric-optical angle $\gamma_0$ (in radians), which corresponds to the initial vision;

The parameters k, m and p are (not necessarily whole number) parameters for describing the vision decline as a function of $\Delta U$;

The output value V of the function in equation (16) has the meaning of the geometric-optical angle (in radians) that corresponds to the current vision. All other vision measurements (thus geometric-optical angles in arc minutes, or vision decimally or vision in log MAR), may be converted according to Table 1.

Figure 2:
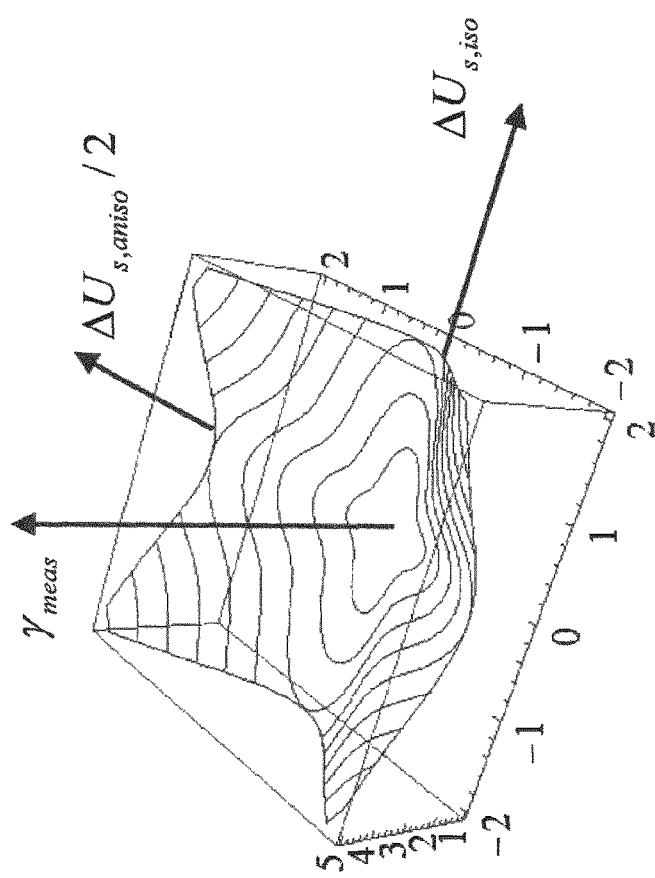
FIG. 2 an example of a vision model.

FIG. 2 shows an example of a vision model for $V(\Delta U_{s,iso}, \Delta U_{s,aniso})$.

In a one-dimensional instance (i.e. if only one type of haze is present, for example a defocus), the basic function from equation (16) may be used directly. Namely, if all components of the eye are rotationally symmetrical, $\Delta U_{s,aniso}=0$ is then the case, and the vision decline is purely a function of $\Delta U_{s,iso}$ alone.

In a two-dimensional instance, it is possible to migrate from $\Delta U_{s,iso}$, $\Delta U_{s,aniso}$ to polar coordinates and to define the following variables derived from the matrix $\Delta U_s$:

$$\tan\varphi = \frac{\Delta U_{s,aniso}/2}{\Delta U_{s,iso}} \quad (17)$$

$$\Delta U_{s,r} = \sqrt{\Delta U_{s,iso}^2 + 1/4 \Delta U_{s,aniso}^2}$$

According to the invention, the following simplifying model assumptions are made:

a) The function $\gamma_{meas}(\Delta U_{s,iso}, \Delta U_{s,aniso})$ is independent of the algebraic sign of the isotropic portion, $\gamma_{meas}(\Delta U_{s,iso}, \Delta U_{s,aniso}) = \gamma_{meas}(+\Delta U_{s,iso}, \Delta U_{s,aniso})$ b) The function $\gamma_{meas}(\Delta U_{s,iso}, \Delta U_{s,aniso})$ is independent of the algebraic sign of the anisotropic portion, $\gamma_{meas}(\Delta U_{s,iso}, -\Delta U_{s,aniso}) = \gamma_{meas}(\Delta U_{s,iso}, +\Delta U_{s,aniso})$ c) For a fixed $\varphi$, the function $\gamma_{meas}(\Delta U_{s,r}, \varphi)$ is a function of the geometry as in equation (16)

Assumption c) may, for example, be realized via the approach $$V(\Delta U_{s,r}, \varphi) = (\gamma_0^{k(\varphi)} + (m(\varphi)\Delta U_{s,r}^{p(\varphi)})^{k(\varphi)})^{1/k(\varphi)}, \quad (18)$$

in which equation (16) is expanded in that the parameters k, p, m (but not $\gamma_0$) are regarded as functions of the angle coordinate $\varphi$.

Conditions a) and b) require $$a) \Rightarrow \gamma_{meas}(\Delta U_{s,r}, \pi-\varphi) = \gamma_{meas}(\Delta U_{s,r}, \varphi)$$

$$b) \Rightarrow \gamma_{meas}(\Delta U_{s,r}, -\varphi) = \gamma_{meas}(\Delta U_{s,r}, +\varphi) \quad (19)$$

and imply a periodicity with the period $\pi$:

$$\gamma_{meas}(\Delta U_{s,r}, \varphi+\pi) = \gamma_{meas}(\Delta U_{s,r}, \varphi) \quad (20)$$

This leads to the approach of a Fourier series that is even at $\varphi$, with the terms 1, cos 2$\varphi$, cos 4$\varphi$, cos 6$\varphi$, . . . . It has proven to be expedient to instead use the equivalent base 1, $\sin^2 \varphi$, $\sin^2 2\varphi$, $\sin^2 3\varphi$, . . . because then practically all base functions except for the first disappear for $\varphi=0$. In the present instance, an expansion up to the order of $\sin^2 2\varphi$ appears to be sufficient. Therefore, the following approximations may be made, for example:

$$k(\varphi) = k_0(1+\kappa_1 \sin^2 \varphi + \kappa_2 \sin^2 2\varphi)$$

$$p(\varphi) = p_0(1+\pi_1 \sin^2 \varphi + \pi_2 \sin^2 2\varphi)$$

$$m(\varphi) = m_0(1+\mu_1 \sin^2 \varphi + \mu_2 \sin^2 2\varphi) \quad (21)$$

$k_0$, $p_0$, $m_0$ are thereby the parameters for $\varphi=0$, thus for the purely isotropic portion of $\Delta U_s$, and $\kappa_i$, $\pi_i$, $\mu_i$ describe the vision model for the presence of anisotropic portions. The effect of these parameters is shown in FIG. 3.

Figure 3:
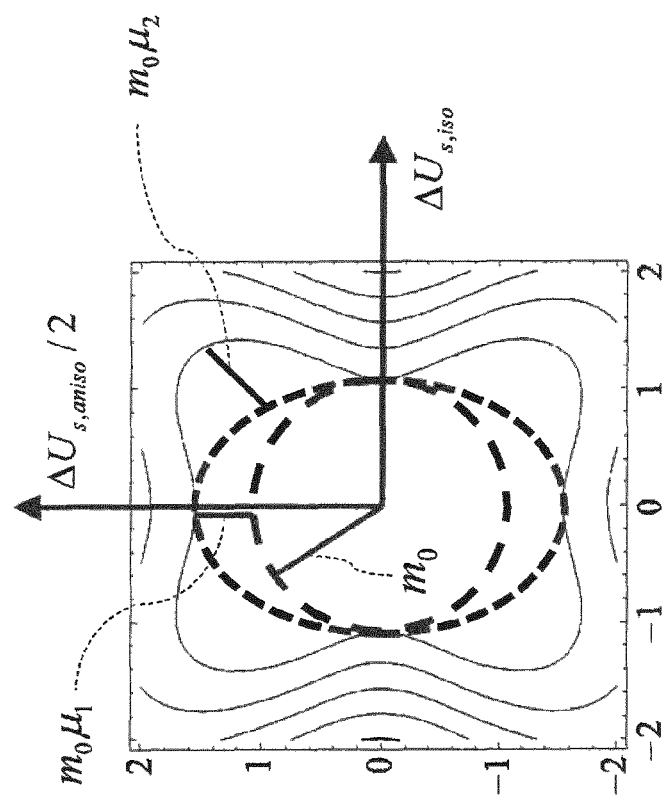
FIG. 3 the degrees of freedom of the parameterization of an example of a vision model.

FIG. 3 shows the degrees of freedom of the $\varphi$-parameterization of the vision model from equation (21) in an example of m($\varphi$), wherein $m_0$ is the circle radius of the isotropic base $\varphi=0$, $m_0\mu_1$ describes the deviation in the direction of the anisotropic axis (approximately elliptical, $\varphi=90°$), and $m_0\mu_2$ describes the deviations from the ellipse in the direction $\varphi=45°$.

The parameters of the vision model may thereby be freely established, or be obtained via data adaptation to vision tests of the spectacles wearer. Defined parameters are preferably identified that do not individually vary, or individually vary only weakly, and which may consequently be adapted to a representative ensemble in an advance study. Only the remaining parameters then need to be adapted to the current spectacles wearer.

A construction of the vision model is particularly preferred in which some parameters are set equal to zero from the outset, and therefore do not need to be determined at all. One embodiment of this is defined by $\kappa_1=\kappa_2=\pi_1=\pi_2=0$, corresponding to the simplified model $$k(\varphi) = k_0$$

$$p(\varphi) = p_0$$

$$m(\varphi) = m_0(1+\mu_1 \sin^2 \varphi + \mu_2 \sin^2 2\varphi) \quad (22)$$

and the multi-dimensional vision model of the form $$V(\Delta U_{s,R}, \varphi) = (\gamma_0^{k_0} + (m(\varphi)\Delta U_{s,R}^{p_0})^{k_0})^{1/k_0} \quad (23)$$

This embodiment is particularly preferred in combination with the procedure that the parameters $k_0$, $p_0$, $\mu_1$, $\mu_2$ are adapted once to an assemblage of data, whereas the parameters m and $\gamma_0$ are individually adapted to the spectacles wearer. For example, the parameter $\gamma_0$ is provided directly by the log MAR value of the initial vision. The parameter m may be determined via the sensitivity, thus in that the vision $V^{Neb}$ is determined once given a distinct haze (for example $\Delta S^{Neb}=1.5$ dpt).

Design of a target function that depends on the associated vision value

In the prior art, a target function of the type $$F_{SPK} = \sum_i [G_{SPK,R,i}(R_{SPK,real}(i) - R_{SPK,target}(i))^2 + \quad (24)$$

$$G_{SPK,A,i}(A_{SPK,real}(i) - A_{SPK,target}(i))^2 +$$

$$G_{SPK,C,i}(C_{SPK,real}(i) - C_{SPK,target}(i))^2 +$$

$$G_{SPK,S,i}(S_{SPK,real}(i) - S_{SPK,target}(i))^2 + \ldots]$$

is minimized with regard to the optimization at the vertex sphere, wherein the first two terms $G_{Ri}(R_{real}(i) - R_{target}(i))^2$ and $G_{A,i}(A_{real}(i) - A_{target}(i))^2$ belong to the residuals of refraction errors and astigmatism at the vertex sphere, and the additional terms correspond to the residuals of further possible features of the vertex sphere that are to be optimized. The variables $G_{SPK,R,i}$, $G_{SPK,A,i}$, $G_{SPK,C,i}$, $G_{SPK,S,i}$, ... are the weights that are utilized in the optimization at the vertex sphere.

In the prior art, with regard to the optimization after the wavetracing in the eye (WO 2013/104548 A1), a target function of the same type as in equation (24) is minimized only in that the terms belong to the corresponding features of the wavefront after the calculation in the eye:

$$F_s = \sum_i [G_{s,R,i}(R_{s,real}(i) - R_{s,target}(i))^2 + G_{s,A,i}(A_{s,real}(i) - A_{s,target}(i))^2 + \quad (25)$$
$$G_{s,C,i}(C_{s,real}(i) - C_{s,target}(i))^2 + G_{s,S,i}(S_{s,real}(i) - S_{s,target}(i))^2 + ...]$$

In contrast thereto, according to one aspect of the invention the optimization occurs directly at vision variables. An example of a target function may thus have the following structure:

$$F_s = \sum_i [G_{s,iso,i}^V(V(\Delta V_{s,iso}(\Delta SD_{s,real}(i))) - V_{s,iso,target}(i))^2 + \quad (26)$$
$$G_{s,aniso,i}^V(V(\Delta V_{aniso,i}(\Delta SD_{s,real}(i))) - V_{s,aniso,target}(i))^2 + ...]$$

Preferably, no additional terms occur after the first two residuals.

In equation (26), $\Delta SD_{s,real}(i)$, stands for the real value of the variable $\Delta SD_s$ according to equation (7c), according to which a spectacle lens is calculated at the i-th assessment point.

The variables $V_{s,iso,target}(i)$ and $V_{s,aniso,target}(i)$ stand for the values of the target vision at the i-th assessment point for the isotropic or the anisotropic contribution. $G_{iso,j}^V$ and $G_{aniso,i}^N$ are the corresponding weightings.

Example 1

In a first example, the values for target vision and weightings can be selected freely.

Example 2

In a second example, only the weights are freely selectable, and the values for the target vision may be obtained via a transformation from target specifications that have already been proven by experience in the optimization at the vertex sphere.

$$V_{s,iso,target}(i) = V(\Delta U_{s,iso}(\Delta SD_{s,iso,target}(i)))$$
$$V_{s,aniso,target}(i) = V(\Delta U_{s,aniso}(\Delta SD_{s,aniso,target}(i))) \quad (27)$$

wherein $\Delta SD_{s,isonominal}(i)$, $\Delta SD_{s,anisonominal}(i)$ stand for the target values of the variable $\Delta SD_s$ according to equation (7c) at the i-th assessment point and are functions of the target specifications at the vertex sphere.

Example 2.1

In an example of a development of example 2.1 which does not take into account the HOAs, according to equation (5) it applies that $$\Delta SD_{s,target}(i) = S_s'^{BG}(S_{target}^{BG}(i)) - D_{LR} \quad (29)$$
$$= S_s'^{BG}(S^R(i) + \Delta S_{target}^{BG}(i)) - D_{LR}$$

wherein $\Delta S_{target}^{BG}(i)$ is the vergence matrix that belongs to a selection of the target specification or to the entirety of the target specifications.

Example 2.1.2

In another development of example 2.1 which takes into account the HOAs, it applies according to equation (6) that $$\Delta SD_{s,target}(i) = \text{Metric}(S_s'^{BG}(S_{target}^{BG}(i)) - R_s') \quad (30)$$
$$= \text{Metric}(S_s'^{BG}(S^R + \Delta S(S_{target}^{BG}(i)) - R_s')$$

wherein $\Delta S_{target}^{BG}(i)$ is the vergence matrix that belongs to a selection of the target specification or to the entirety of the target specifications. Furthermore, $\Delta S(\Delta S_{target}^{BG}(i))$ is the wavefront associated therewith in the selected wavefront representation.

Example 2.2

In a development of example 2, $\Delta SD_{s,iso,target}(i)$, $\Delta SD_{s,anisotarget}(i)$ are not provided by the same function.

Example 2.2.1

In a development of example 2.2 which does not take the HOAs into account, according to equation (5) it applies that $$\Delta SD_{s,iso,nominal}(i) = S_s'^{BG}(S^R(i) + \Delta S_{iso,nominal}^{BG}(i)) - D_{LR}$$
$$\Delta SD_{s,aniso,nominal}(i) = S_s'^{BG}(S^R(i) + \Delta S_{aniso,nominal}^{BG}(i)) - D_{LR} \quad (31)$$

wherein $\Delta S_{iso,target}^{BG}(i)$, $\Delta S_{aniso,target}^{BG}(i)$ are the vergence matrices that both belong to independent selections of the target specifications or to the entirety of the target specifications. Particularly preferred is $$\Delta S_{iso,target}^{BG}(i) = \Delta S_{R,target}^{BG}(i)$$
$$\Delta S_{aniso,target}^{BG}(i) = \Delta S_{A,target}^{BG}(i), \quad (32)$$

wherein $$\Delta S_{R,target}^{BG}(i) = \Delta S(R_{SPK,target}(i))$$
$$\Delta S_{A,target}^{BG}(i) = \Delta S(A_{SPK,target}(i)) \quad (33)$$

are the vergence matrices that correspond to the target values of refraction errors or astigmatism.

Example 2.2.2

In a development of example 2.2 which takes the HOAs into account, according to equation (6)

$$\Delta SD_{s,iso,target}(i) = \text{Metric}(S_s'^{BG}(S^R + \Delta S(\Delta S(R_{SPK,target}(i)))) - R_s')$$
$$\Delta SD_{s,aniso,target}(i) = \text{Metric}(S_s'^{BG}(S^R + \Delta S(\Delta S(A_{SPK,target}(i)))) - R_s') \quad (34)$$

Parameters of the Vision Model:
The transformations in the instance without HOAs $$\Delta S \xrightarrow{A} \Delta SD_s \xrightarrow{A,r_{EP}} \Delta U_s \xrightarrow{\omega_0} V \quad (35)$$

and the transformations in the instance with HOAs $$\Delta S \rightarrow \Delta S \xrightarrow{A} \Delta SD_s \xrightarrow{A,r_{EP}} \Delta U_s \xrightarrow{\omega_0} V \quad (36)$$

still depend on the following parameters: the transition of $\Delta S$ or $\Delta S$ to $\Delta SD_s$ depends on the eye model whose parameters are summarized in a vector A; the transition from $\Delta SD_s$ to $\Delta U_s$ depends on the eye model A, and additionally on the entrance pupil $r_{EP}$; and the transition from $r_{EP}$ to V depends on the vision model whose parameters are summarized in a vector $\omega_0$. For the preferred vision model, it applies that $$\omega_0 = \begin{pmatrix} \gamma_0 \\ m_0 \end{pmatrix}, \quad (37)$$

and for the preferred eye model in the purely spherical instance, without HOAs $$A(C, M, Akk) = \begin{pmatrix} C \\ L_1(C, M, Akk) \\ L_2(Akk) \\ \tau_{CL}(Akk) \\ \tau_L(Akk) \\ \tau_{LR}(M) \end{pmatrix}; \quad (38a)$$

in the sphero-cylindrical instance without HOAs $$A(C, M, J, Akk) = \begin{pmatrix} C \\ L_1(C, M, J, Akk) \\ L_2(Akk) \\ \tau_{CL}(Akk) \\ \tau_L(Akk) \\ \tau_{LR}(M) \end{pmatrix}; \quad (38b)$$

and in the general instance including HOAs $$A(C, W, Akk) = \begin{pmatrix} C \\ L_1(C, W, Akk) \\ L_2(Akk) \\ \tau_{CL}(Akk) \\ \tau_L(Akk) \\ \tau_{LR}(M) \end{pmatrix}; \quad (38c)$$

wherein $(M, J)^T$ is the power vector of the subjective classification, and Akk is the accommodation.

In the above formulas,

C designates the cornea data set, including higher orders;

$L_1$ indicates the data set for leading lens surface, including higher orders;

$L_2$ indicates the data set for rear lens surface, including higher orders.

The nomenclature that is used thereby corresponds to that of the publication WO 2013/104548 A1.

Furthermore, standard populations of these models are provided that are preferably defined by average population values. The standard values of the parameters are characterized by a superscript '0'.

The symbol $r_{EP}^0$ stands for a standard entrance pupil; for a standard vision model it applies that $$\omega_0 = \begin{pmatrix} \gamma_0^0 \\ m_0^0 \end{pmatrix}; \quad (39)$$

for the preferred standard eye model in the purely spherical instance without HOAs, it applies that $$A^0(M, Akk) = \begin{pmatrix} C(L_1^0, M) \\ L_1(L_1^0, Akk) \\ L_2(Akk) \\ \tau_{CL}^0(Akk) \\ \tau_L(Akk) \\ \tau_{LR}(M) \end{pmatrix}; \quad (40a)$$

in the sphero-cylindrical instance without HOAs it applies that $$A^0(M, Akk) = \begin{pmatrix} C(L_1^0, M, J = 0) \\ L_1(L_1^0, Akk) \\ L_2(Akk) \\ \tau_{CL}^0(Akk) \\ \tau_L(Akk) \\ \tau_{LR}(M) \end{pmatrix}; \quad (40b)$$

and in the general instance including HOAs, it applies that $$A^0(M, Akk) = \begin{pmatrix} C(L_1^0, W^0) \\ L_1(L_1^0, Akk) \\ L_2(Akk) \\ \tau_{CL}^0(Akk) \\ \tau_L(Akk) \\ \tau_{LR}(M) \end{pmatrix}, \quad (40c)$$

wherein the wavefront $W^0$ associated with an ametropia M, $J_0$, $J_{45}$ with standard HOA is provided by $$W^0(M) = \begin{pmatrix} c_2^0(M) \\ c_2^2(J_0 = 0) \\ c_2^{-2}(J_{45} = 0) \\ c_3^3 \\ \vdots \end{pmatrix} \quad (41)$$

For the current calculation, the vision V is preferably performed with the individual parameters; by contrast, the calculation of the target vision is performed using standard parameters. If only subsets of the parameters are known (for example because, although the parameters of the eye model are individually present, those of the vision model are not), then the unknown parameters are preferably also replaced by standard values in the current calculation.

Example 3

In a particularly preferred example, neither the weights nor the target specifications can be freely selected; rather, but may be obtained via a transformation from the weights and target specifications that have already been proved experimentally in the optimization to the vertex sphere.

The target specifications may be determined as in conjunction with the above embodiments 2.1, 2.1, . . . , 2.2.2. With regard to the weights, possible embodiments differ in which model parameters are used in which transformation. The functions from equation (35) or equation (36) may be designated as follows:

$\Delta SD_s(\Delta S^{BG}, A)$ $\Delta U_s(\Delta SD_s, A, r_{EP})$ $V(\Delta U_s, \omega_0)$ \quad (42)

It is stipulated that, for a spectacles wearer for whom all parameters correspond to the standard parameters ($\Delta S^{BG}$, $A=A^0$, $r_{EP}=r_{EP}^0$, $\omega_0=\omega_0^0$, $J=0$), an optimization by means of the target function $F_s$ from equation (26) leads to the same spectacle lens as an optimization by means of the target function $F_{SPK}$ from equation (24) according to the prior art. It is thereby ensured that improvements with respect to the prior art may be specifically controlled via the deviations of the parameters from their standard values.

In one embodiment of the invention, the uniformity of the optimization results is ensured in that, for standard values, each term from the target function $F_s$ is equal to a corresponding term from the target function $F_{SPK}$.

In one embodiment, this is ensured by the stipulation $$G_{s,iso,i}^V[V(\Delta U_{s,iso}(\Delta SD_s(\Delta S^{BG}(i),A^0),A^0,r_{EP}^0),\omega_0^0)-V(\Delta U_{s,iso}(\Delta SD_s(\Delta S_{iso,target}^{BG}(i),A^0),A^0,r_{EP}^0),\omega_0^0)]^2=G_{SPK,R,i}(A_{SPK,real}(i)-A_{SPK,target}(i))^2$$

$$G_{s,aniso,i}^V[V(\Delta U_{s,aniso}(\Delta SD_s(\Delta S^{BG}(i),A^0),A^0,r_{EP}^0),\omega_0^0)-V(\Delta U_{s,aniso}(\Delta SD_s(\Delta S_{aniso,target}^{BG}(i),A^0),A^0,r_{EP}^0),\omega_0^0)]^2=G_{SPK,R,i}(R_{SPK,real}(i)-R_{SPK,target}(i))^2 \quad (43)$$

which for the weights means $$G_{s,iso,i}^V = \frac{G_{SPK,R,i}(A_{SPK,real}(i)-A_{SPK,target}(i))^2}{V(\Delta U_{s,iso}(\Delta SD_s(\Delta S^{BG}(i),A^0),A^0,r_{EP}^0),\omega_0^0)-V(\Delta U_{s,iso}(\Delta SD_s(\Delta S_{iso,target}^{BG}(i),A^0),A^0,r_{EP}^0),\omega_0^0)]^2} \quad (43a)$$

$$G_{s,aniso,i}^V = \frac{G_{SPK,R,i}(R_{SPK,real}(i)-R_{SPK,target}(i))^2}{V(\Delta U_{s,aniso}(\Delta SD_s(\Delta S^{BG}(i),A^0),A^0,r_{EP}^0),\omega_0^0)-V(\Delta U_{s,iso}(\Delta SD_s(\Delta S_{aniso,target}^{BG}(i),A^0),A^0,r_{EP}^0),\omega_0^0)]^2}$$

In a further preferred embodiment, this is ensured by the stipulation $$G_{s,iso,i}^V[V(\Delta U_{s,iso}(\Delta SD_s(\Delta S^{BG}(i),A^0),A^0,r_{EP}^0),\omega_0^0)-V(\Delta U_{s,iso}(\Delta SD_s(\Delta S_{iso,target}^{BG}(i),A^0),A^0,r_{EP}^0),\omega_0^0)]^2=G_{SPK,R,i}(R_{SPK,real}(i)-R_{SPK,target}(i))^2,$$

$$G_{s,aniso,i}^V[V(\Delta U_{s,aniso}(\Delta SD_s(\Delta S^{BG}(i),A^0),A^0,r_{EP}^0),\omega_0^0)-V(\Delta U_{s,aniso}(\Delta SD_s(\Delta S_{aniso,target}^{BG}(i),A^0),A^0,r_{EP}^0),\omega_0^0)]^2=G_{SPK,R,i}(R_{SPK,real}(i)-R_{SPK,target}(i))^2 \quad (44)$$

which for the weights means $$G_{s,iso,i}^V = \frac{G_{SPK,R,i}(R_{SPK,lst}(i)-R_{SPK,target}(i))^2}{V(\Delta U_{s,iso}(\Delta SD_s(\Delta S^{BG}(i),A^0),A^0,r_{EP}^0),\omega_0^0)-V(\Delta U_{s,iso}(\Delta SD_s(\Delta S_{iso,target}^{BG}(i),A^0),A^0,r_{EP}^0),\omega_0^0)]^2} \quad (44a)$$

$$G_{s,aniso,i}^V = \frac{G_{SPK,R,i}(A_{SPK,lst}(i)-A_{SPK,target}(i))^2}{V(\Delta U_{s,aniso}(\Delta SD_s(\Delta S^{BG}(i),A^0),A^0,r_{EP}^0),\omega_0^0)-V(\Delta U_{s,iso}(\Delta SD_s(\Delta S_{aniso,target}^{BG}(i),A^0),A^0,r_{EP}^0),\omega_0^0)]^2}$$

One advantage of the procedure according to the invention is that the target function $$F_s = \sum_i \begin{vmatrix} G_{s,iso,i}^V V(\Delta U_{s,iso}(\Delta SD_s(\Delta S^{BG}(i),A),A,r_{EP}),\omega_0) - \\ V(\Delta U_{s,iso}(\Delta SD_s(\Delta S_{iso,target}^{BG}(i),A^0),A^0,r_{EP}^0),\omega_0^0)]^2 ++ \\ G_{s,aniso,i}^V V(\Delta U_{s,aniso}(\Delta SD_s(\Delta S^{BG}(i),A),A,r_{EP}),\omega_0) - \\ V(\Delta U_{s,aniso}(\Delta SD_s(\Delta S_{aniso,target}^{BG}(i),A^0),A^0,r_{EP}^0),\omega_0^0)]^2 \end{vmatrix} \quad (45)$$

for standard values reduces to $F_{SPK}$; by contrast, for non-standard values it produces variations via which the aberrations of the spectacle lens distribute differently, in a way that leads to advantages for given parameters (for example vision model).

Figure 4:
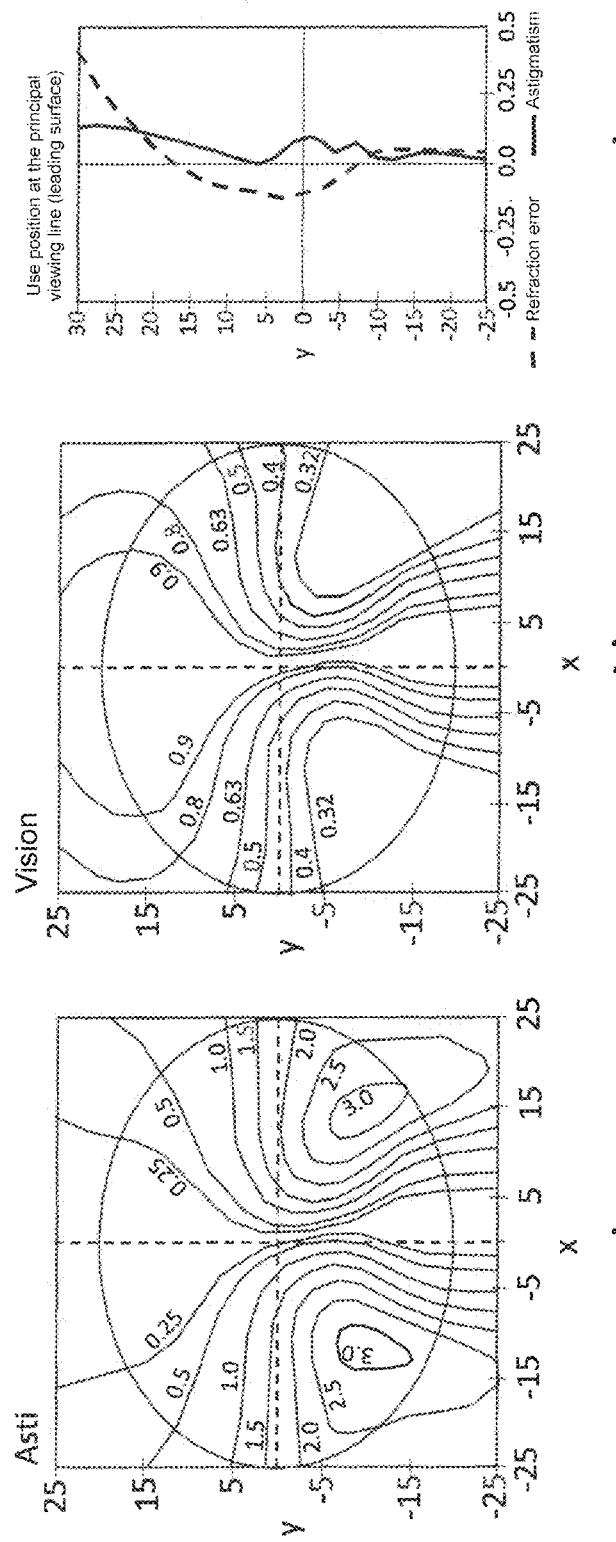
FIG. 4 the results of a standard optimization of a spectacle lens at the vertex sphere.

FIG. 4 shows the results of a standard optimization of a spectacle lens at the vertex sphere (SPK) for a prescription of sphere Sph=−4.25 dpt, cylinder Cyl=0 dpt, and addition Add=2.5 dpt. FIG. 4a shows the distribution of the astigmatism (Asti), FIG. 4b shows the distribution of the vision, and FIG. 4c shows the curve of the refraction error (dashed line) and of the astigmatism (solid line) along the principal line on the leading surface of the spectacle lens. The spectacle lens is optimized with standard values for the cornea, the HOAs, and the vision model: initial vision=1.25 (decimal), by contrast to which only a vision=0.97 is optimized at the vertex sphere according to the prior art given haze with 1.3 dpt.

Figure 5:
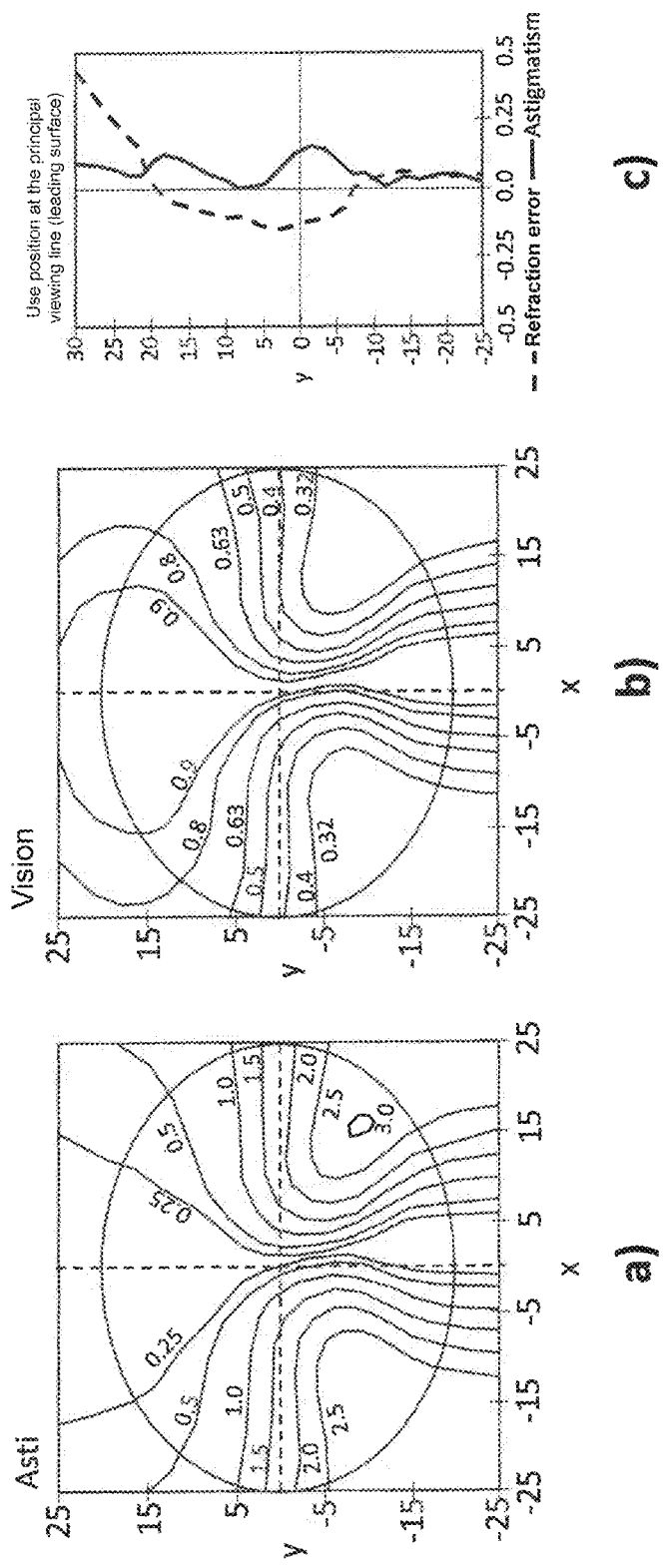
FIG. 5 the results of an example of an optimization of a spectacle lens, taking into account the vision, according to the invention.

FIG. 5 shows the result of an optimization of a spectacle lens with calculation in the eye, and with parameters of the vision model that deviate from the standard, namely with poorer initial vision. FIG. 5a shows the distribution of the astigmatism (Asti), FIG. 5b shows the distribution of the vision, and FIG. 5c shows the curve of the refraction error (dashed line) and of the astigmatism (solid line) along the principal line on the leading surface of the spectacle lens.

If the spectacle lens shown in FIG. 4 having the values Sph=−4.25 dpt, Cyl=0 dpt, and Add=2.5 dpt is optimized for a spectacles wearer having deviating vision data (by contrast initial vision 1.00 (decimal) given a haze with 1.3 dpt, vision of only 0.9), then the result shown in FIG. 5 results. It is apparent that the spectacle lens obtains a peripheral astigmatism as a consequence of the adapted weight factors in equation (45). Although the zones of good seeing are slightly smaller in the spectacle lens (which, however, does not represent a severe disadvantage for a spectacle lens with poorer initial vision), the advantages of this predominate due to the slight peripheral astigmatism and the lessened shaking effect that is linked therewith.

REFERENCE LIST

EP entrance pupil of the eye;
AP exit pupil of the eye;
SK vertex sphere;
e corneal vertex distance;
$r_0$ pupil radius, here used only generically as a reference radius given the description via Zernike coefficients;
$r_R$ radius of the dispersion disc;
$d_{LR}$ distance of the rear lens surface from the exit pupil;
$d_{AR}$ distance of the rear lens surface from the retina

The invention claimed is:
1. A computer-implemented method for calculating or assessing a spectacles lens for an eye of a spectacles wearer, comprising:
   (a) providing a comparative association of at least one imaging property or aberration of a spectacle lens system with a visual acuity of the spectacles wearer when observing an object through the spectacle lens system, wherein the spectacle lens system is a combination of the spectacles lens and the eye or an eye model of the spectacles wearer, and the spectacles wearer is a specific spectacles wearer or an average spectacles wearer;
   (b) determining or prescribing a target function for the spectacles lens to be calculated or assessed, in which the association from step (a) is to be evaluated; and

(c) calculating or assessing the spectacles lens to be calculated or assessed by evaluating the target function, wherein:
- $V_{real}(\Delta U_{s,j}(i))$ designates the vision acuity, which is determined using the association and an actual value of the at least one imaging property of the spectacle lens to be calculated or assessed at the i-th assessment point,
- the subscript s designates an arbitrary evaluation surface of the at least one imaging property or aberration, and
- the subscript j, j≥1 designates a j-th imaging property or aberration, and wherein the target function that depends on the visual acuity V via the association of the at least one imaging property or aberration $\Delta U_{s,j}$ with the visual acuity of the specific spectacles wearer or of the average spectacles wearer is represented as:

$$F_s = \sum_i \left[ G_{s,j,i}^V (V_{real}(\Delta U_{s,j}(i)) - V_{target}(\Delta U_{s,j}(i)))^2 + \ldots \right],$$

wherein:
- $G_{s,j,i}^V$ designates weighting of the visual acuity at the i-th assessment point, prescribed by the association with the at least one imaging property or aberration $\Delta U_{s,j}(i)$, and
- $V_{target}(\Delta U_{s,j}(i))$ designates a target value of the visual acuity.

2. The computer-implemented method according to claim 1, wherein the calculating or assessing comprises optimizing the spectacles lens by minimizing or maximizing the target function.

3. The computer-implemented method according to claim 1, further comprising:
calculating at least one light beam emanating from the object for at least one viewing direction, with the aid of wavetracing, raytracing, or wave field calculation through the spectacles lens system or through the spectacles lens alone up to an evaluation surface.

4. The computer-implemented method according to claim 3, further comprising:
calculating the difference, present at the evaluation surface, of the light beam emanating from the object in comparison to a reference light beam converging on the retina of a model eye; and
determining the at least one imaging property or aberration using the calculated difference.

5. The computer-implemented method according to claim 3, wherein the calculating at least one light beam emanating from the object takes place by means of wavetracing, and wherein the calculating the difference present at the evaluation surface comprises calculating the wavefront difference between the wavefront of the light beam emanating from the object and the wavefront of the reference light beam converging on the retina, wherein the wavefront difference is calculated at the evaluation surface.

6. The computer-implemented method according to claim 5, further comprising associating a geometric/optical angle or a quadratic form in space of a geometric/optical angle with the wavefront difference to be calculated, wherein the at least one imaging property or aberration depends on at least one component of the geometric/optical angle or the quadratic form.

7. The computer-implemented method according to claim 1, wherein the provision of the comparative association of the at least one imaging property or aberration of the spectacles lens system with the visual acuity of the spectacles wearer parametrically depends on a measured initial visual acuity or a measured sensitivity of the eye of the spectacles wearer, and wherein the measured sensitivity of the spectacles wearer corresponds to the visual acuity of the spectacles wearer which was measured given a predetermined faulty correction.

8. The computer-implemented method according to claim 1, wherein the provision of the comparative association of the at least one imaging property or aberration comprises using a value pair based on:
a visual acuity value of one of the eyes of the spectacles wearer upon viewing through the spectacles lens system, and
a spherical or astigmatic value of refractive power.

9. The computer-implemented method according to claim 8, wherein:
the value of the refractive power is provided by the refraction value of one of the eyes of the spectacles wearer when observing the object through the spectacle lens system, or
the refractive power is provided by the refraction value of one of the eyes of the spectacles wearer plus a spherical or astigmatic haze when observing the object through the spectacle lens system.

10. The computer-implemented method according to claim 9, wherein the refractive power is provided by the refraction value of one of the eyes of the spectacles wearer plus the spherical or astigmatic haze plus an additional dioptric spacing from the refraction value of a model eye, said dioptric spacing corresponding to a haze has a value of between 0.5 dpt and 3.0 dpt.

11. The computer-implemented method according to claim 1, wherein the spectacles lens system comprises a spectacles lens and a model eye, and the model eye is described with at least one of the following parameters: eye length, separations and curvatures of the refractive surfaces, refractive indices of the refractive media, pupil diameter, and position of the pupils.

12. The computer-implemented method according to claim 11, wherein at least one of the parameters of the model eye has been individually measured in the spectacles wearer, or at least one of the parameters of the model eye has been individually determined from individual measurement values.

13. An apparatus for calculating or assessing a spectacles lens for a spectacles wearer, comprising a calculator configured to calculate or assess the spectacles lens according to a method for calculating or assessing a spectacles lens according to claim 1.

14. A non-transitory computer program product which comprises a program code that is configured to implement the method for calculating or assessing a spectacles lens according to claim 1 when loaded and executed on a computer.

15. A method for producing a spectacles lens, comprising:
calculating a spectacles lens according to the method for calculating a spectacles lens according to claim 1; and
manufacturing the calculated spectacles lens.

16. An apparatus for producing a spectacles lens, comprising:
a calculator or optimizer configured to calculate the spectacles lens according to the method for calculating a spectacles lens according to claim 1; and a manufacturing device configured to manufacture the spectacles lens according to the result of the calculation.

\* \* \* \* \*